United States Patent [19]

Conn

[11] Patent Number: 5,042,748
[45] Date of Patent: Aug. 27, 1991

[54] HOT AIR RESCUE BALLOON

[76] Inventor: Sidney H. Conn, 139 N. Mulberry St., Statesville, N.C. 28677

[21] Appl. No.: 532,582

[22] Filed: Jun. 4, 1990

Related U.S. Application Data

[63] Continuation-in-part of Ser. No. 192,189, May 10, 1988, Pat. No. 4,932,606.

[51] Int. Cl.$^5$ .............................................. B64B 1/50
[52] U.S. Cl. ....................................... 244/33; 244/31; 244/96; 244/93; 244/127; 182/142
[58] Field of Search ..................... 244/93, 96, 127, 30, 244/31, 33; 182/50, 51, 142

[56] References Cited

U.S. PATENT DOCUMENTS

4,084,771  4/1978  Creuzet ............................... 244/98
4,421,204  12/1983  Lawrence ............................ 244/33

Primary Examiner—Joseph F. Peters, Jr.
Assistant Examiner—Anne E. Bidwell
Attorney, Agent, or Firm—W. Thad Adams, III

[57] ABSTRACT

A rescue balloon for rescuing individuals from high places such as towers and building includes an enclosed envelope for holding heated air under substantially greater than atmospheric pressure with a burner contained within the enclosed envelope for burning a combustible gas to generate sufficient heated air under pressure in the envelope to provide lift to the balloon. A rescue compartment is carried by the envelope for accommodating rescued individuals and a tether is provided for guiding the balloon as necessary to effect rescues. The balloon includes a porous blast shield positioned within the envelope to prevent direct contact between the envelope and the flame of the burner. The blast shield comprises an upright cylinder supported and secured in fixed relation within the envelope by a plurality of catenaries attached to the blast shield and to the inner walls of the envelope around its perimeter. The burn super-pressurizes the heated air within the envelope. The balloon also includes a fuel supply positioned within the envelope for supplying fuel to the burner, and a cantilever beam positioned in the envelope for counterbalancing the load in the balloon as the load varies according to the number and position of rescued individuals on the balloon and the amount of fuel consumed. The cantilever beam is positioned within the envelope with the fuel supply mounted on the beam. The fuel supply is moved along the beam in response to changes in the balance, or tilt, of the balloon envelope.

9 Claims, 6 Drawing Sheets

HOT AIR RESCUE BALLOON

TECHNICAL FIELD AND BACKGROUND OF THE INVENTION

This application is a continuation-in-part of Ser. No. 192,189, filed on May 10, 1988, now U.S. Pat. No. 4,982,606.

This invention relates to a hot air rescue balloon which is particularly intended for use in rescuing individuals from tall structures such as buildings and towers. The rescue balloon is characterized by being compact when not inflated, easy to transport and quick to inflate and use. The balloon is stable, will carry a substantial amount of weight and is easily maneuvered when in use.

As structures are designed to be taller and taller, conventional rescue methods become impractical. Nets are essentially useless at heights above 100 ft. Ropes and ladders are in and of themselves dangerous and difficult to use, especially by very young and older persons. Fire truck extension ladders are also limited to relatively low heights—certainly only a small fraction of the height of modern skyscrapers and radio and television towers. A need exists for a rescue device which is usable by fire departments and rescue squads in a wide variety of circumstances to rescue individuals from heights. To be practical, the rescue device must be affordable, relatively easy to use, adaptable to a wide variety of circumstances and quickly put into use. This invention relates to a new type of hot air balloon which achieves these goals.

SUMMARY OF THE INVENTION

Therefore, it is an object of the invention to provide a rescue balloon which is compact and easy to transport.

It is another object of the invention to provide a rescue balloon which is usable in a wide variety of circumstances.

It is another object of the invention to provide a rescue balloon which carries a substantial amount of weight and is maneuverable.

These and other objects of the present invention are achieved in the preferred embodiments disclosed below by providing a rescue balloon for rescuing individuals from high places such as towers and buildings, and comprising an enclosed envelope for holding heated air under substantially greater than atmospheric pressure with a burner contained within the enclosed envelope for burning a combustible gas to generate sufficient heated air under pressure in the envelope to provide lift to the balloon. Rescue compartment means are carried by the envelope for accommodating rescued individuals and tether means are provided for guiding the balloon as necessary to effect rescues.

Preferably, the balloon envelope is substantially quadralinear in horizontal cross-section to present a flat face adjacent to a flat face of a building to facilitate the simultaneous rescue along a substantial vertical and horizontal surface area of the building.

According to one preferred embodiment of the invention, the balloon includes a porous blast shield within the envelope to protect the envelope itself from direct contact with the flame of the burner and fuel tanks for supplying the burner.

According to one preferred embodiment of the invention, the rescue compartment means comprises a compartment carried by the bottom of the envelope below the burner and including an entrance to the outside of the envelope for ingress and egress.

According to another preferred embodiment of the invention, the balloon includes a porous blast shield positioned within the envelope to prevent direct contact between the envelope and the flame of the burner, and wherein the blast shield comprises an upright cylinder supported and secured in fixed relation within the envelope by a plurality of catenaries attached to the blast shield and to the inner walls of the envelope around the perimeter thereof.

Preferably, the balloon includes a blower fan for superpressurizing the heated air within the envelope.

According to one preferred embodiment of the invention, the rescue balloon includes fuel supply means positioned within the envelope for supplying fuel to the burner and cantilever means positioned in the envelope for counterbalancing the load in the balloon as the load varies according to the number and position of rescued individuals on the balloon and the amount of fuel consumed. The cantilever means comprises an elongate beam positioned within the envelope, the fuel supply means mounted on the beam and moveable thereon and means for moving the fuel supply means along the beam in response to changes in the balance of the envelope.

According to one preferred embodiment of the invention, the means for moving the fuel supply comprises a motor carried and movable with the fuel supply means, drive means carried by the motor, and driven means carried by the beam and cooperating with the drive means to move the fuel supply means along the beam.

According to another preferred embodiment of the invention, the drive means comprises a drive gear rotatable by the motor and the driven means comprises a rack gear formed in the beam along a substantial part of its length.

Preferably, the cantilever means comprises first and second parallel and spaced-apart beams each having a rack gear formed therein along a substantial part of their respective lengths, the fuel supply means comprises at least one fuel tank mounted for movement along the length of the first and second beams, and wherein the motor includes first and second drive gears for driving the first and second racks and thereby moving the fuel tank along the beams.

According to another preferred embodiment of the invention, the balloon includes attitude sensing means for sensing the attitude of the balloon envelope, and servo means for being actuated by the attitude sensing means and for operating the movement means to move the fuel supply along the beam in the proper direction to compensate for changes in attitude sensed by the attitude sensing means.

Preferably, the attitude sensing means comprises a two-quadrant attitude sensor, an input signal amplifier, a signal integrator and a servo-driver for outputting a motor direction signal to the movement means.

Preferably, the tether means comprises at least two cables connected by one end to the envelope and for being positioned at spaced-apart points on an anchoring surface, and winching means for independently controlling the length of the cables to selectively position the balloon a predetermined positions.

Preferably, the invention includes means for holding the balloon against the surface of the building during rescue operations.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
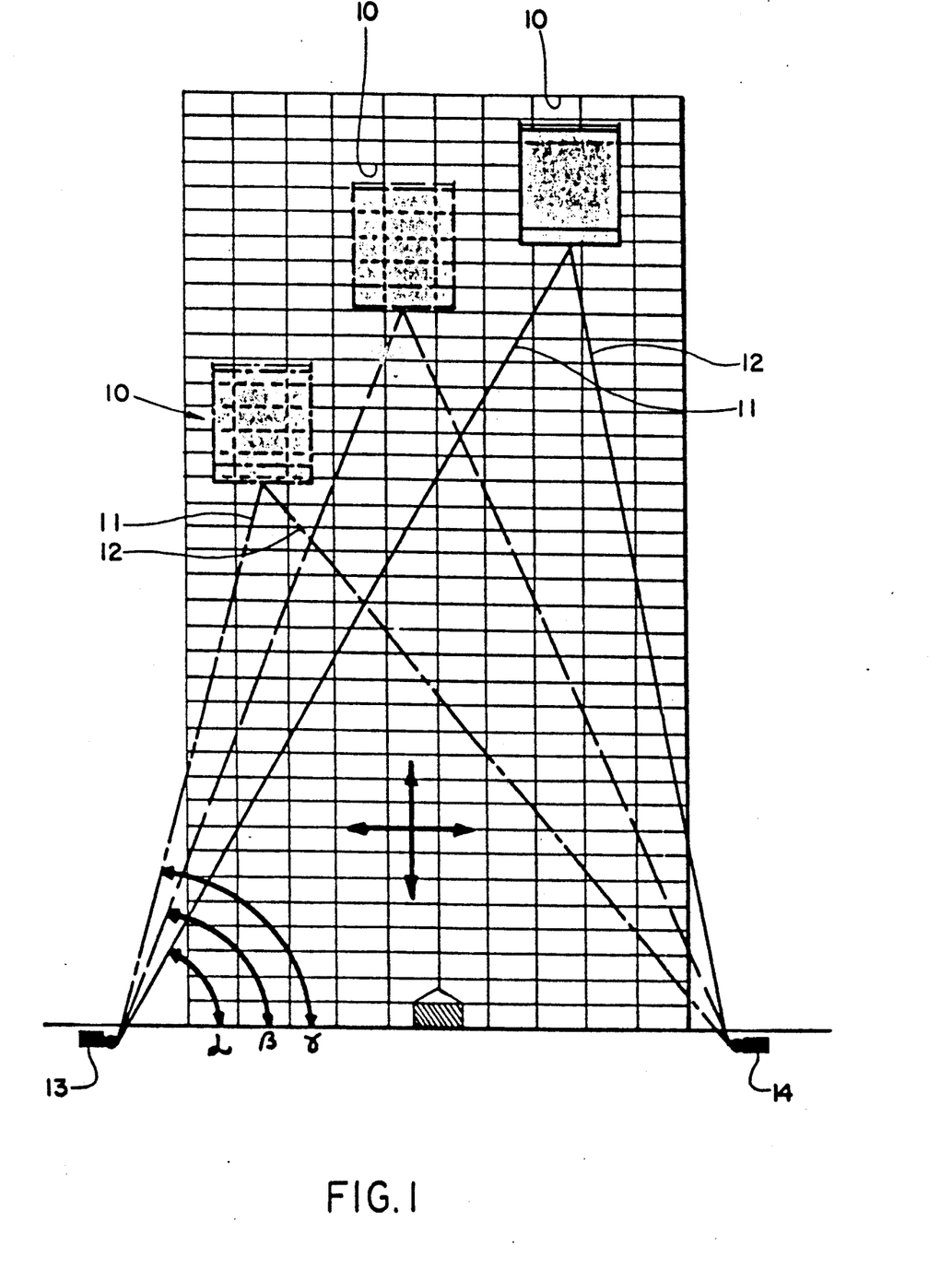
FIG. 1 is a schematic elevation of a tall building with a rescue balloon according to the invention being maneuvered along its face.

Referring now specifically to the drawings, a hot air rescue balloon according to the present invention is illustrated in FIG. 1 and shown generally at reference numeral 10. Before describing in detail the design and construction of the balloon 10, in general mode of operation will be described. As is shown in FIG. 1, the balloon 10 is intended to be used to rescue individuals from tall buildings and other structures. The balloon is maneuvered adjacent to a building and then is moved along the side of the building being controlled by cables. In the embodiment shown in FIG. 1, a pair of cables 11, 12 are controlled by winches 13, 14 positioned in spaced-apart relation on the ground. Movement of the balloon to a desired location can be controlled by differential, independent control of the length of the cables 11, 12. This type of control permits movement of the balloon to any point on the face of the building without movement of the winches or other support equipment on the ground. This is particularly important in situations such as fires, where movement around the base of the building may be hindered by the presence of other equipment or by debris.

The balloon is delivered to the site in an uninflated form. Typically, it will be stored on a vehicle operated by a fire department or rescue squad. Once use is completed, the balloon is deflated, cleaned, repaired if needed, replenished with fuel and stored for its next use.

Figure 2:
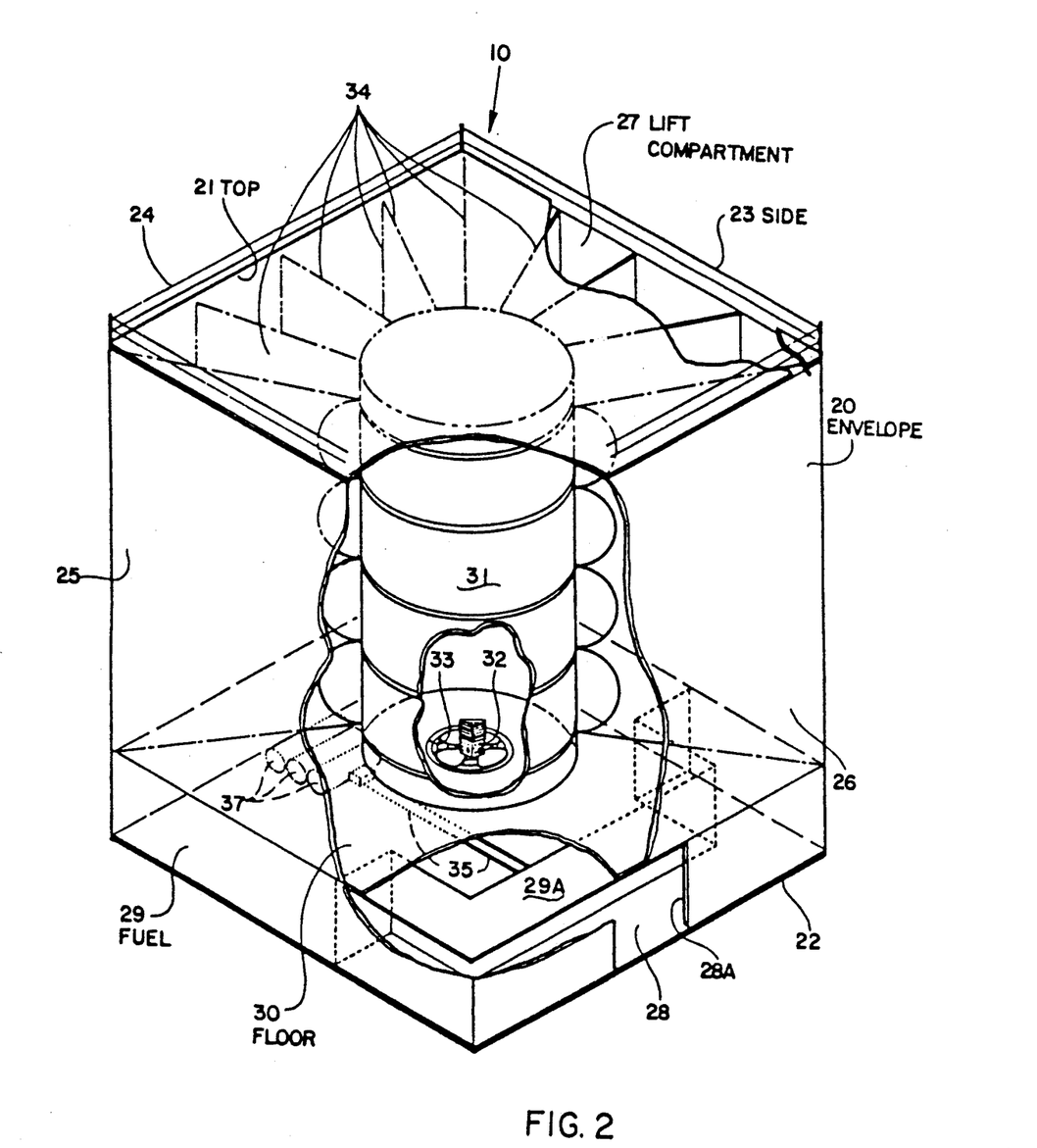
FIG. 2 is a fragmentary perspective view, with parts broken away, of the rescue balloon.
Figure 3:
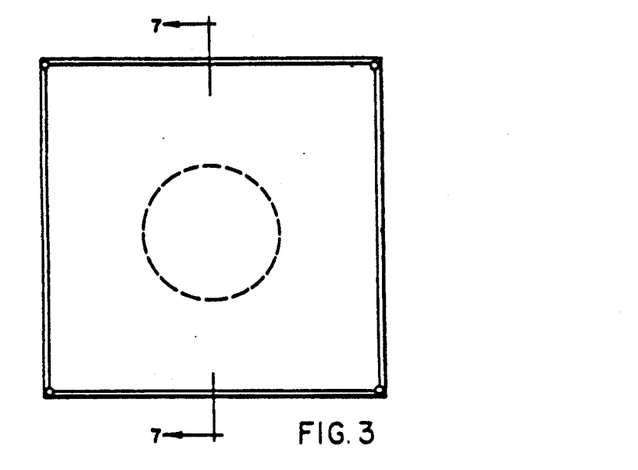
FIG. 3 is a schematic horizontal cross-sectional view of the balloon through the midsection of the balloon.
Figure 4:
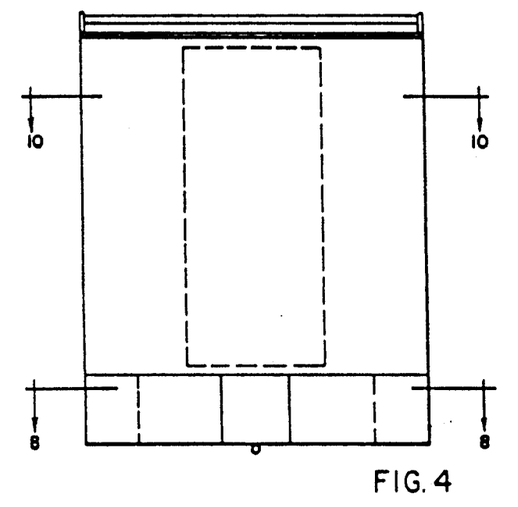
FIG. 4 is a schematic vertical cross-sectional view of the balloon through the midsection of the balloon.
Figure 5:
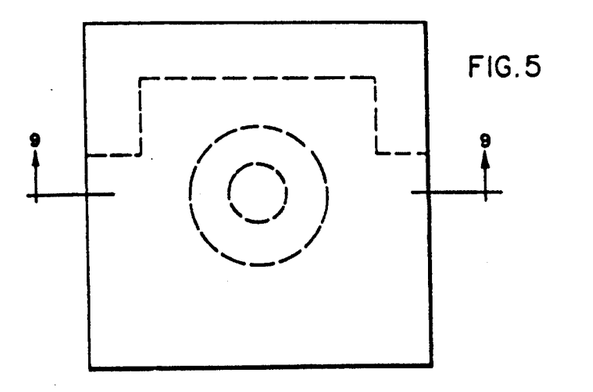
FIG. 5 is a schematic horizontal cross-sectional view of the balloon through the passenger compartment and burner sections.
Figure 6:
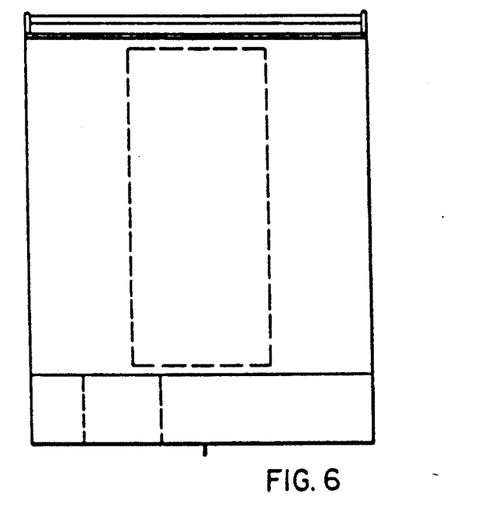
FIG. 6 is a schematic vertical cross-sectional view of the balloon through the midsection at 90° to the cross-section of FIG. 4.

Referring now more specifically to the structure of the balloon 10, FIG. 2 illustrates the overall construction. As is shown, the balloon 10 is formed of an envelope 20 constructed in a square shape to define a rectangular structure having a top 21, a bottom 22 and four sides 23, 24 25 and 26. Of course, other shapes are possible, but the rectangular shape provides a good balance between air capacity, stability, lifting capability and compactness. The flat sides 23, 24, 25 and 26 are ideal for fitting flush against the flat wall of a building. A suitable size for the balloon is approximately 9-10 meters on a side and 12-14 meters high. The envelope is constructed of a Kevlar type of nonflammable aramid fiber and may include double thickness walls or preferably may be constructed of a 2-3 cm thick honeycomb material which provides resistance to flame and heat, and also insulation to reduce heat loss through the envelope to the environment.

Referring still to FIG. 2, envelope 20 is divided into three main compartments. The largest compartment is the lift compartment 27, which is divided from the rescue compartment 28 and the fuel tank compartment 29 by a floor 30. The rescue compartment 28 and the fuel compartment 29 are separated by a vertical wall 29A, as is best shown in FIGS. 2, 7, 8 and 9. Ingress and egress to the rescue compartment is provided by a door 28A. The lift compartment 27 is about 10-12 meters high and the rescue and fuel tank compartments are 2-3 meters high. Lift compartment 27 contains an upright cylindrical blast shield 31 secured to floor 30 and surrounding a burner and pressurizing fan 32 mounted in an access hole 33 in floor 30. Blast shield is constructed of a blend of PBI or PBI/Nomex or PBI/Nomex/Kevlar fiber in a woven construction. The fabric is porous, thereby permitting a free flow of air while preventing direct contact between the flame of the burner 32 and the walls of envelope 20.

Figure 7:
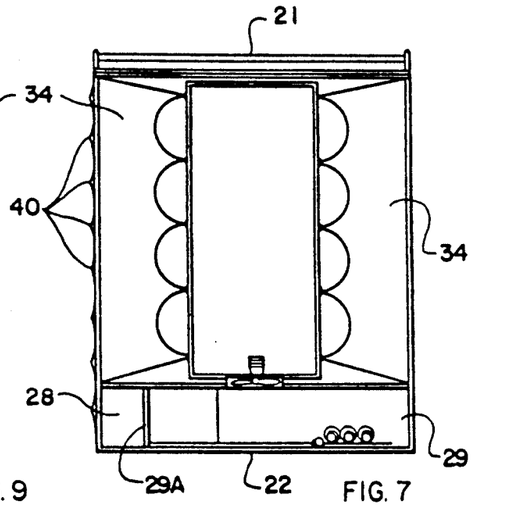
FIG. 7 is a vertical cross-section of the balloon taken along lines 7—7 of FIG. 3.
Figure 9:
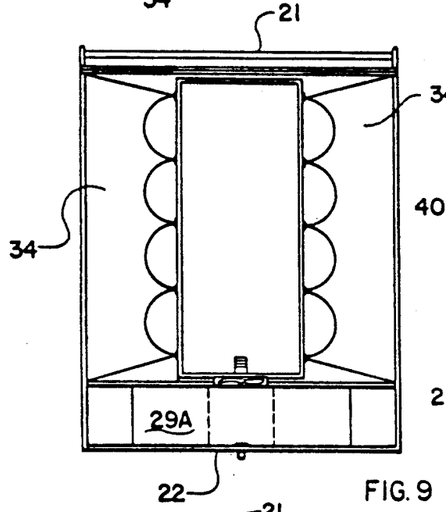
FIG. 9 is a vertical cross-section of the balloon taken along lines 9—9 of FIG. 5.
Figure 10:
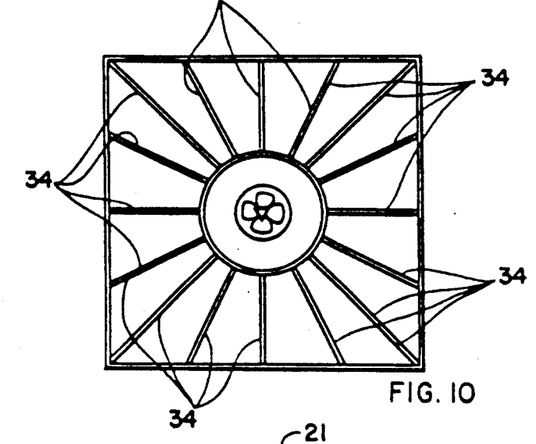
FIG. 10 is a horizontal cross-section of the balloon taken along lines 10—10 of FIG. 4.
Figure 11:
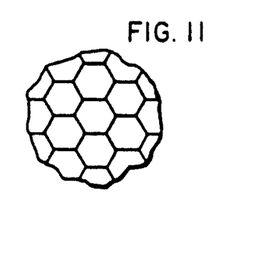
FIG. 11 is an enlarged, fragmentary view of the honeycomb Kevlar material used as the flooring, top and bottom of the balloon.

As is shown in FIG. 2 and also in FIGS. 7, 9 and 10, blast shield is secured in the proper position within lift compartment 27 by series of catenaries 34. Catenaries 34 comprise a series of interior panels constructed of woven Nomex attached by one end to the inner walls of the envelope 20 and by the other end to blast shield 31. Note particularly in FIGS. 1, 7 and 9 that the catenaries 34 are scalloped on the end attached to blast shield 31, thereby each providing several spaced-apart attachment points which suspend the blast shield 31 without interfering unduly with air circulation. The upper extent of the blast shield 31 is spaced-apart from the top 21 of envelope 20 to further permit air flow around and between the blast shield 31 and the interior of the envelope 20. The fuel compartment 29 occupies the major portion of the area beneath lift compartment 27.

A pair of cantilevers beam 35A, 35B are positioned in fuel compartment 29 and extend outwardly from the side of the envelope 20 where the rescue compartment 28 is located towards the other side of the envelope 20. Three cylindrical fuel tanks 37 are mounted cross-wise on beams 35A, 35B and are moveable along beams 35A, 35B from one end to the other. Beams 35A, 35B serve to permit the balloon to be properly balanced at all times and conditions. When the balloon is empty of occupants the balloon is otherwise relatively symmetrically balanced and the fuel tanks 37 are positioned on beams 35A, 35B in the approximate center of the balloon. Little movement from this position will occur as fuel is consumed, so long as the balloon is empty of occupants since the weight of the balloon decreases slightly but the balance does not change. However, as the weight in the rescue compartment increases, the weight of the balloon becomes quite asymmetrically distributed. Fuel tanks 37 are therefore moved outwardly along beams 35A, 35B away from rescue compartment 28. The increased length of the lever arm balances the weight of the balloon. As fuel is consumed in this asymmetric position, the fuel tanks are moved further outwardly along beams 35A, 35B.

Figure 12:
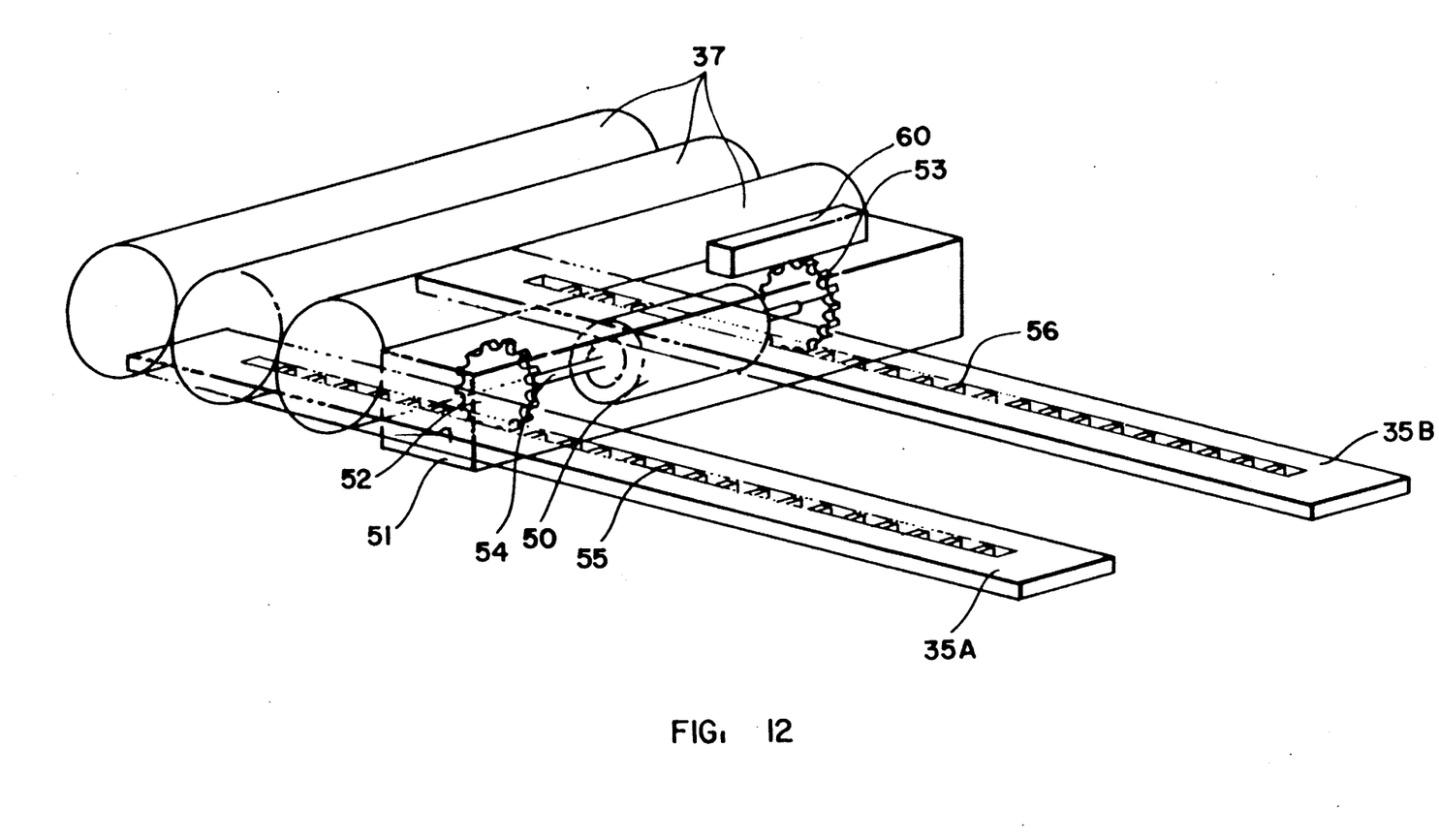
FIG. 12 is a schematic view of the cantilever beams and the means by which the fuel tanks are moved along the beam to adjust for balloon tilt.

The fuel tanks 37 are moved by a tractor drive motor 50 carried in a housing 51 which is connected to the fuel tanks 37. Motor 50 is a reversing drive motor which rotates a pair of drive gears 52, 53 which are mounted on opposite ends of a drive shaft 54. Gears 52, 53 cooperate with toothed racks 55, 56 provided along the length of beams 35A, 35B. Operation of motor 50 moves the motor itself and the fuel tanks in one direction or the other along beams 35A, 35B.

Figure 13:
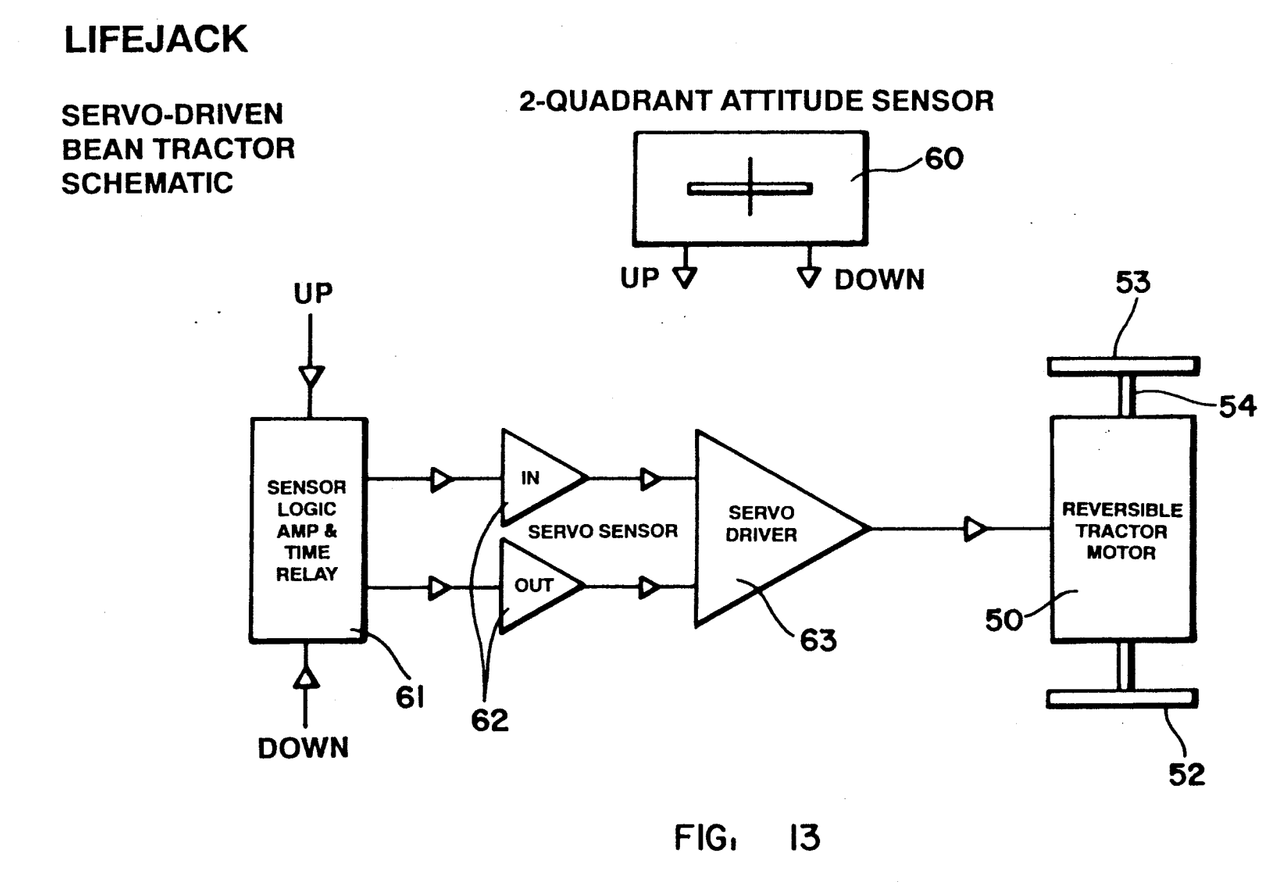
FIG. 13 is a schematic view of the attitude sensing means.

The degree and direction of movement of motor 50 is determined by an attitude sensor 60 of conventional design which detects tilt of the balloon from the vertical axis. As is shown in FIG. 13, attitude sensor 60 outputs a signal to a sensor logic amplifier and time delay circuit 61. The time delay circuit prevents momentary or "rocking" motions of short duration from activating the system. Signals are outputted from circuit 61 and are integrated in a servo-sensor 62 before being outputted to a servo-driver circuit 63. Circuit 63 outputs a directional drive signal to motor 50 for so long as attitude sensor 60 indicates a tilt condition. Because of the servo-operation of the system, operation of the motor 50 and its resulting movement adjusts for the tilt. When the attitude sensor no longer detects a tilt, no signal is outputted, thereby stopping operation of motor 50.

Balloon tilt can be caused by passenger loading, wind gusts or depletion of the fuel itself. Since the attitude sensor 60 is blind to the cause of the tilt, any or all of these conditions in any combination are sensed and corrected.

The lift of the balloon is also automatically sensed and compensated for. Sensors on the load lines measure differential stress on the lines because of the lift minus the negative lift provided by passenger loading, wind gusts and the like. Instantaneous differential outputs provided by semi-bonded strain gauges are amplified and activate the fuel supply solenoids, thereby cutting the burner on or off. Additional differential sensors measure internal envelope and ambient temperature to establish baseline lift for the system. This lift is continuously updated as the outside temperature conditions change because of the heat generated by the fire itself.

Figure 8:
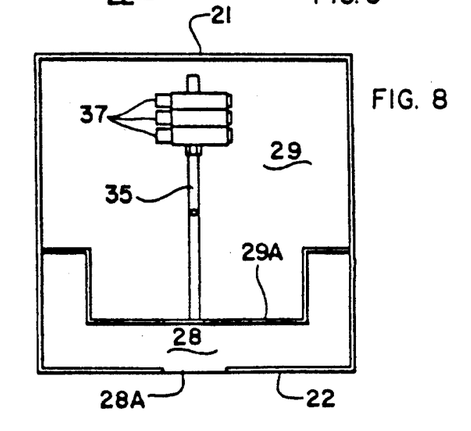
FIG. 8 is a vertical cross-section of the balloon taken along lines 8—8 of FIG. 4.

As is best shown in FIGS. 2 and 8, the rescue compartment 28 occupies a relatively small portion of the lower level of envelope 20. Nevertheless, the overall size of the area is sufficient to hold a large number, for example, 12 persons. As is apparent, the side of the envelope having the rescue compartment 28 and the door 28A is positioned closest to the building to permit access to the rescue compartment 28 from the building. Ideally, a grappling device holds the balloon against the building. The grappling device may take many forms but can be a winch line connected to a window washing track slider, a concrete anchor, a grapple connected to a balcony, and so forth.

In addition to the rescue compartment 28, further rescue means in the form of hooks, hand holds, nets or webbing 40 can be attached to the rescue compartment side (see FIG. 7) and top of the balloon. This would provide a means for persons to get to the door 28A and also, as a last resort, further space for building occupants if the rescue compartment 28 is full or inaccessible.

Air is heated inside the envelope 20 and under pressure. This is in contrast to the usual hot air balloon where air is heated on the exterior of envelope beneath an opening to the atmosphere and projected into the envelope by the burner. The fuel used is preferably propane gas just as is used in conventional hot air balloons. The burner is operated by suitable remote control means (not shown) and a fan drives air into the lift compartment 27. Air heated in this way can achieve a very high temperature on the order of 290–315° C. Air at this temperature in a balloon of the size described above can provide approximately 2 metric tons of lift. From cold start to full inflation occurs in approximately 10 minutes.

In a preferred, anticipated embodiment of the rescue balloon, the passenger compartment occupies 348 square feet and the upper platform 1600 square feet. Fuel tanks 37 are each 20 gallon cylindrical tanks which weigh 48 pounds empty and 132 pounds full. Of course, different numbers and sizes of tanks can be used as needed or desired.

A hot air rescue balloon is described above. Various details of the invention may be changed without departing from its scope. Furthermore, the foregoing description of the preferred embodiment according to the present invention is provided for the purpose of illustration only and not for the purpose of limitation--the invention being defined by the claims.

What is claimed is:

1. A rescue balloon for rescuing individuals from high places such as towers and buildings, comprising:
   (a) an enclosed envelope for holding heated air under substantially greater than atmospheric pressure;
   (b) a burner contained within said enclosed envelope for burning a combustible gas to generate sufficient heated air under pressure in said envelope to provide lift to said balloon;
   (c) rescue compartment means carried by said envelope for accommodating rescued individuals;
   (d) tether means for guiding the balloon as necessary to effect rescues;
   (e) fuel supply means positioned within said envelope for supplying fuel to said burner; and
   (f) cantilever means positioned in said envelope for counterbalancing the load in the balloon as the load varies according to the number and position of rescued individuals on the balloon and the amount of fuel consumed, said cantilever means comprising an elongate beam positioned within said envelope, said fuel supply means mounted on said beam and moveable thereon and movement means for moving said fuel supply means along said beam in response to changes in the balance of the envelope.

2. A rescue balloon according to claim 1, wherein said movement means comprises a motor carried and movable with said fuel supply means, drive means carried by said motor, and driven means carried by said beam and cooperating with said drive means to move said fuel supply means along said beam.

3. A rescue balloon according to claim 2, wherein said drive means comprises a drive gear rotatable by said motor and said driven means comprises a rack gear formed in said beam along a substantial part of its length.

4. A rescue balloon according to claim 3, wherein said cantilever means comprises first and second parallel and spaced-apart beams each having a rack gear formed therein along a substantial part of their respective lengths, said fuel supply means comprises at least one fuel tank mounted for movement along the length of said first and second beams, and wherein said motor includes first and second drive gears for driving said first and second racks and thereby moving said fuel tank along said beams.

5. A rescue balloon according to claim 1, and including:
(g) attitude sensing means for sensing the attitude of the balloon envelope, and
(h) servo means for being actuated by said attitude sensing means and for operating said movement means to move said fuel supply along said beam in the proper direction to compensate for changes in attitude sensed by said attitude sensing means.

6. A rescue balloon according to claim 5, wherein said attitude sensing means comprises a two-quadrant attitude sensor, an input signal amplifier, a signal integrator and a servo-driver for outputting a motor direction signal to said movement means.

7. A rescue balloon according to claim 6, wherein said movement means comprises a motor carried and movable with said fuel supply means, drive means carried by said motor, and driven means carried by said beam and cooperating with said drive means to move said fuel supply means along said beam.

8. A rescue balloon according to claim 7, wherein said drive means comprises a drive gear rotatable by said motor and said driven means comprises a rack gear formed in said beam along a substantial part of its length.

9. A rescue balloon according to claim 8, wherein said cantilever means comprises first and second parallel and spaced-apart beams each having a rack gear formed therein along a substantial part of their respective lengths, said fuel supply means comprises at least one fuel tank mounted for movement along the length of said first and second beams, and wherein said motor includes first and second drive gears for driving said first and second racks and thereby moving said fuel tank along said beams.

* * * * *